(12) United States Patent
Yumoto (10) Patent No.: US 11,479,187 B2
(45) Date of Patent: Oct. 25, 2022

(54) BEARING STRUCTURE WITH POWER FEEDING PATH

(71) Applicant: Tachi-S Co., Ltd., Tokyo (JP)

(72) Inventor: Tsuyoshi Yumoto, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 517 days.

(21) Appl. No.: 16/583,458

(22) Filed: Sep. 26, 2019

(65) Prior Publication Data

US 2020/0276941 A1 Sep. 3, 2020

(30) Foreign Application Priority Data

Mar. 1, 2019 (JP) .............................. JP2019-037579

(51) Int. Cl.
| | |
|---|---|
| *B60R 16/02* | (2006.01) |
| *F16C 17/02* | (2006.01) |
| *B60R 16/03* | (2006.01) |

(52) U.S. Cl.
CPC .......... *B60R 16/0207* (2013.01); *B60R 16/03* (2013.01); *F16C 17/02* (2013.01); *F16C 2380/00* (2013.01)

(58) Field of Classification Search
None
See application file for complete search history.

(56) References Cited

U.S. PATENT DOCUMENTS

| | | | | | |
|---|---|---|---|---|---|
| 4,633,731 | A | * | 1/1987 | Kurata | B60R 16/027 200/61.54 |
| 5,034,570 | A | * | 7/1991 | Johansson | H02G 11/00 248/51 |
| 5,460,535 | A | * | 10/1995 | Bolen | B60R 16/027 439/15 |
| 5,593,310 | A | * | 1/1997 | Kawamoto | B60R 16/027 439/15 |
| 5,674,081 | A | * | 10/1997 | Hoffmann | B60R 16/027 439/15 |
| 5,683,260 | A | * | 11/1997 | Kato | H01R 35/025 439/15 |
| 5,704,792 | A | * | 1/1998 | Sobhani | H01R 39/64 439/21 |

(Continued)

FOREIGN PATENT DOCUMENTS

| | | | | |
|---|---|---|---|---|
| DE | 19508259 | A1 * | 9/1995 | ........... B60R 16/027 |
| DE | 19717625 | A1 * | 11/1997 | ........... B60R 16/027 |

(Continued)

*Primary Examiner* — Timothy J. Dole
*Assistant Examiner* — Muhammed Azam
(74) *Attorney, Agent, or Firm* — Morgan, Lewis & Bockius LLP (57) ABSTRACT

A bearing structure includes a base-side unit structure provided on a bearing member side, a rotary member-side unit structure relatively rotatable with respect to the base-side unit structure, an arcuate or circumferential conductor provided in one of the base-side unit structure and the rotary member-side unit structure, and a contactor provided in the other of the unit structures and configured to retain an electric conduction state with the conductor and includes a power feeding path configured by a power feeding harness for feeding electric power from a power feeding device of a vehicle to an electric device of the rotary member via the conductor and the contactor.

6 Claims, 9 Drawing Sheets

(56) References Cited

U.S. PATENT DOCUMENTS

| | | | | |
|---|---|---|---|---|
| 5,741,145 | A * | 4/1998 | Kikkawa | H01R 35/025 439/15 |
| 5,775,920 | A * | 7/1998 | Henderson | B60R 16/027 439/15 |
| 5,872,343 | A * | 2/1999 | Yokoyama | B60R 16/02 200/61.54 |
| 5,971,781 | A * | 10/1999 | Lagier | B60R 16/027 439/15 |
| 6,039,402 | A * | 3/2000 | Nemoto | B60N 2/245 296/65.05 |
| 6,042,405 | A * | 3/2000 | Masuda | H01R 35/025 439/15 |
| 6,299,454 | B1 * | 10/2001 | Henderson | H01R 39/64 439/19 |
| 6,435,886 | B2 * | 8/2002 | Oguma | H01R 35/025 439/15 |
| 6,644,978 | B2 * | 11/2003 | Araki | H01R 35/025 439/15 |
| 6,764,326 | B2 * | 7/2004 | Matsumoto | H01R 39/64 439/15 |
| 8,808,008 | B2 * | 8/2014 | Hirai | H01R 43/002 439/15 |
| 10,286,861 | B2 * | 5/2019 | Sakai | H01R 35/04 |
| 2002/0019157 | A1 * | 2/2002 | Oguma | H01R 35/025 439/164 |
| 2002/0050730 | A1 * | 5/2002 | Kondo | B60R 16/0207 297/217.3 |
| 2002/0115321 | A1 * | 8/2002 | Mange | B60R 16/027 439/164 |
| 2003/0073333 | A1 * | 4/2003 | Matsumoto | H01R 39/64 439/164 |
| 2004/0124704 | A1 * | 7/2004 | Kazmierczak | B60R 16/027 340/870.31 |
| 2004/0159764 | A1 * | 8/2004 | Oshima | B60N 2/067 296/65.13 |
| 2006/0057863 | A1 * | 3/2006 | Araki | B60R 16/027 439/15 |
| 2006/0171621 | A1 * | 8/2006 | Kroner | F16C 25/02 384/295 |
| 2007/0227854 | A1 * | 10/2007 | Cabrit | B60N 2/167 192/223.2 |
| 2010/0237178 | A1 * | 9/2010 | Nakamura | B25J 19/0029 242/388.9 |
| 2014/0353415 | A1 * | 12/2014 | Katsuramaki | H02G 11/02 29/428 |
| 2015/0001327 | A1 * | 1/2015 | Hamada | B65H 75/44 242/376 |
| 2015/0258925 | A1 * | 9/2015 | An | B60N 2/01508 297/463.1 |
| 2015/0283924 | A1 * | 10/2015 | Boutouil | B60N 2/0232 16/354 |
| 2016/0059801 | A1 * | 3/2016 | Katsuramaki | B60R 16/0215 191/12.2 R |
| 2016/0211633 | A1 * | 7/2016 | Legoubin | B64D 37/08 |
| 2016/0347209 | A1 * | 12/2016 | Pluta | B60N 2/0881 |
| 2017/0076886 | A1 * | 3/2017 | Van Vooren | B60R 16/02 |
| 2017/0080828 | A1 * | 3/2017 | Aktas | B60N 2/2356 |
| 2017/0203676 | A1 * | 7/2017 | Dunn | B60N 2/305 |
| 2017/0210252 | A1 * | 7/2017 | Izawa | B60N 2/168 |
| 2017/0294767 | A1 * | 10/2017 | Sano | H02G 3/0437 |
| 2018/0178751 | A1 * | 6/2018 | Katsuramaki | B60R 22/4604 |
| 2018/0241165 | A1 * | 8/2018 | Matsuo | H01B 7/08 |
| 2018/0347619 | A1 * | 12/2018 | Kapusky | B60N 2/3013 |
| 2019/0023091 | A1 * | 1/2019 | Spindler | B60C 23/004 |
| 2019/0225118 | A1 * | 7/2019 | Tindall | B60N 2/067 |
| 2019/0382230 | A1 * | 12/2019 | Hamada | B60R 16/027 |
| 2020/0276941 | A1 * | 9/2020 | Yumoto | F16C 17/02 |
| 2020/0307475 | A1 * | 10/2020 | Yamamoto | B60R 16/0215 |

FOREIGN PATENT DOCUMENTS

| | | | | |
|---|---|---|---|---|
| EP | 0629027 A1 * | 6/1994 | | |
| EP | 0704345 A1 * | 9/1995 | | |
| EP | 680850 A1 * | 11/1995 | | B60R 16/027 |
| EP | 704345 A1 * | 4/1996 | | B60R 16/027 |
| EP | 0730325 A1 * | 9/1996 | | |
| EP | 744794 A2 * | 11/1996 | | H01R 39/64 |
| EP | 863587 A1 * | 9/1998 | | B60R 16/027 |
| FR | 2719711 A1 * | 11/1995 | | B60R 16/027 |
| FR | 2719712 A1 * | 11/1995 | | B60R 16/027 |
| JP | 2731304 B2 | 12/1997 | | |
| JP | H10275668 A * | 10/1998 | | |
| JP | 2009-029358 A | 2/2009 | | |
| KR | 20150028836 A * | 3/2015 | | |
| WO | WO-9709202 A1 * | 3/1997 | | B60R 16/027 |
| WO | WO-0184677 A1 * | 11/2001 | | B60R 16/027 |
| WO | WO-2014207327 A1 * | 12/2014 | | B60R 16/027 |

* cited by examiner

BEARING STRUCTURE WITH POWER FEEDING PATH

CROSS-REFERENCES TO RELATED APPLICATIONS

This application relates to and claims priority from Japanese Patent Application No. JP2019-037579, filed on Mar. 1, 2019, the entire disclosure of which is incorporated herein by reference.

BACKGROUND

Field

The present invention relates to a bearing structure with a power feeding path.

Description of Related Art

Figure 9A:
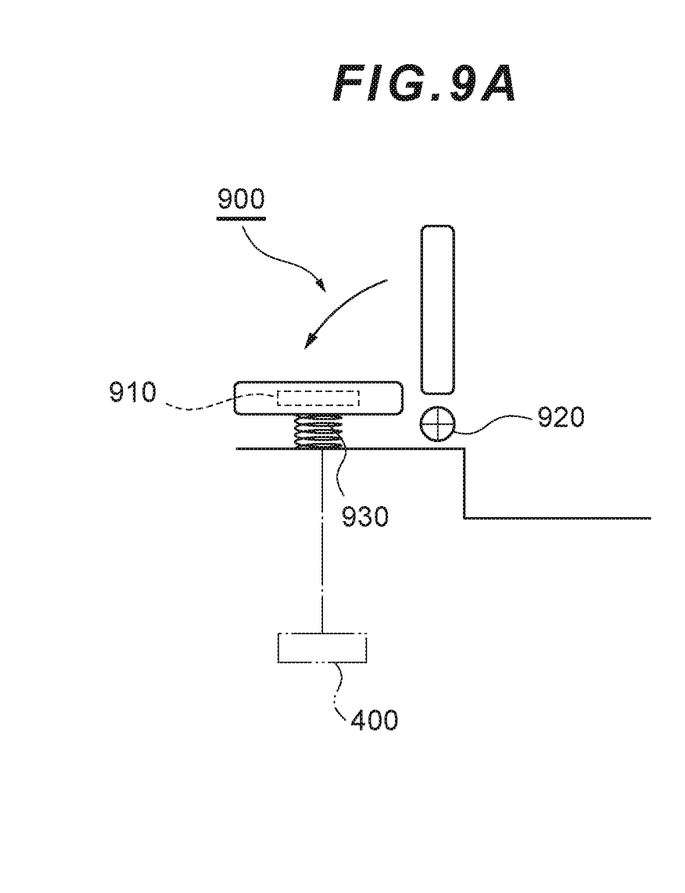
FIGS. 9A and 9B are reference diagrams showing an example of a form in which a power feeding path to a device is provided around a rotating shaft for a flip-up motion in a seat.
Figure 9B:
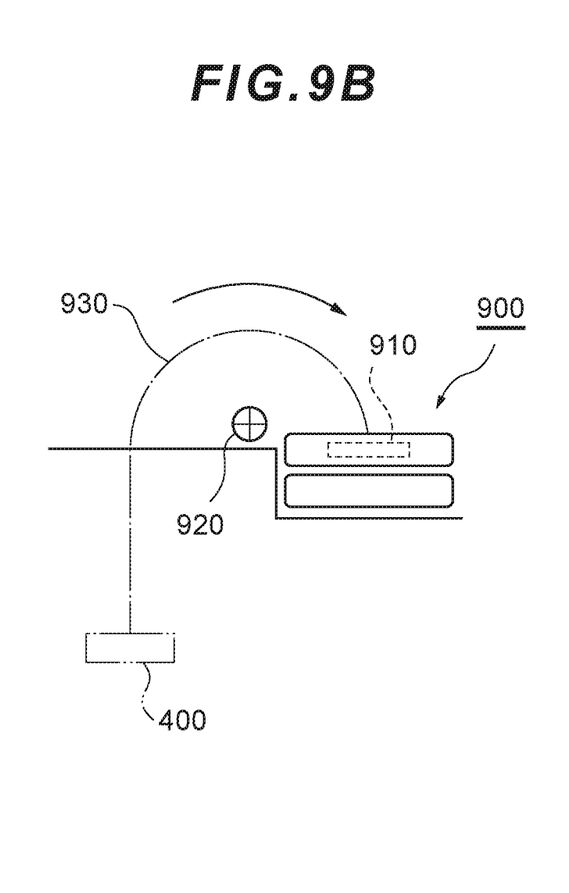

Power feeding paths provided to feed electric power to a movable section, a cover structures that protects the power feeding path in a vehicle, or the like have been proposed (see Patent Publication JP 2009-029358 A). For example, in a device 910 such as a seat belt reminder or a heater is provided in a flip-up seat 900 provided in a rear seat of a vehicle, which is storable in an under-floor space, it is conceivable to provide a power feeding path 930 to the device 910 around a rotating shaft 920 for a seat flip-up motion (see FIGS. 9A and 9B).

However, when the power feeding path is provided around the rotating shaft for the seat flip-up motion as explained above, it is necessary to provide an excess length for preventing a harness from being stretched in the flip-up motion, prevent the harness having the excess length from being bit, and improve appearance of the harness when being slacked. If a power feeding cover for covering the harness having the excess length in this way, the power feeding cover becomes a protrusion and reduces an effect of enlarging a vehicle interior space.

SUMMARY

Therefore, an object of the present invention is to provide a bearing structure with a power feeding path in which it is unnecessary to provide an excess length in a harness and improve the appearance of the harness and it is unnecessary to provide a power feeding cover.

According to an aspect of the present invention, provided is a bearing structure with a power feeding path, the bearing structure including a bearing member that supports a rotatable rotary member and being configured to be attached to a vehicle, the bearing structure including: a power feeding unit including a base-side unit structure provided on the bearing member side, a rotary member-side unit structure relatively rotatable with respect to the base-side unit structure and provided on the rotary member side, an arcuate or circumferential conductor provided in one of the base-side unit structure and the rotary member-side unit structure, and a contactor provided in another of the base-side unit structure and the rotary member-side unit structure and configured to retain an electric conduction state with the conductor; and a power feeding path configured by a power feeding harness for feeding, via the conductor and the contactor, electric power from a power feeding device of the vehicle to an electric device provided in the rotary member.

According to the above aspect, a conduction path including the contactor and the conductor that always retain the electric conduction state is configured between the rotary member and the bearing member. Therefore, it is unnecessary to provide an excess length for preventing the harness from being stretched, prevent the harness having the excess length from being bit, and improve appearance of the harness when being slacked as in the structure in the past.

In the bearing structure according to the above aspect, the power feeding unit may be disposed in a position interposed between a member configuring the rotary member and a member configuring the bearing member.

In the bearing structure according to the above aspect, the contactor may be formed by an elastic body that urges the base-side unit structure and the rotary member-side unit structure to directions in which the base-side unit structure and the rotary member-side unit structure are separated from each other.

In the bearing structure according to the above aspect, the contactor may be formed in a wavy shape.

In the bearing structure according to the above aspect, a retaining section that retains a position of the contactor may be formed in the power feeding unit.

In the bearing structure according to the above aspect, a plurality of the power feeding paths may be present, and a plurality of the contactors may be provided in the power feeding paths.

In the bearing structure according to the above aspect, the contactors may be disposed in positions equally divided in a circumferential direction.

In the bearing structure according to the above aspect, a stopper that restricts a relative rotating motion of the base-side unit structure or the rotary member-side unit structure may be provided in the power feeding unit.

In the bearing structure according to the above aspect, the rotary member may be a flip-up storable seat provided in a rear part of the vehicle.

According to the present invention, it is possible to provide a bearing structure with a power feeding path in which it is unnecessary to provide an excess length in a harness and improve the appearance of the harness and it is unnecessary to provide a power feeding cover.

DETAILED DESCRIPTION

An embodiment of a bearing structure with a power feeding path according to the present invention is explained in detail below with reference to the drawings. As a preferred example, in the following explanation, an example is explained in which a such a bearing structure is applied to a seat 100 in a rear seat of a vehicle (see FIGS. 1 to 7).

Figure 1A:
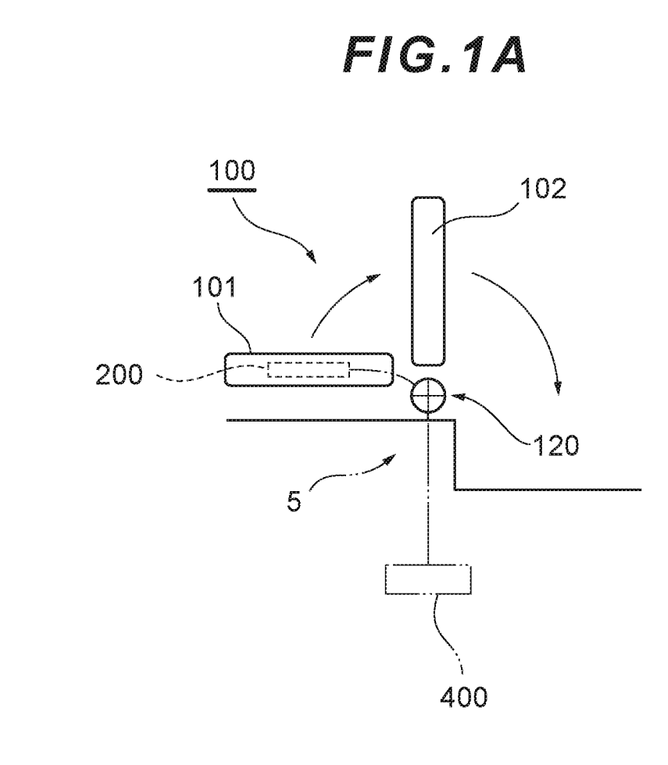
FIGS. 1A and 1B are diagrams for explaining an example of a configuration around a rotating shaft at the time of a flip-up motion in a seat applied with the present invention.
Figure 1B:
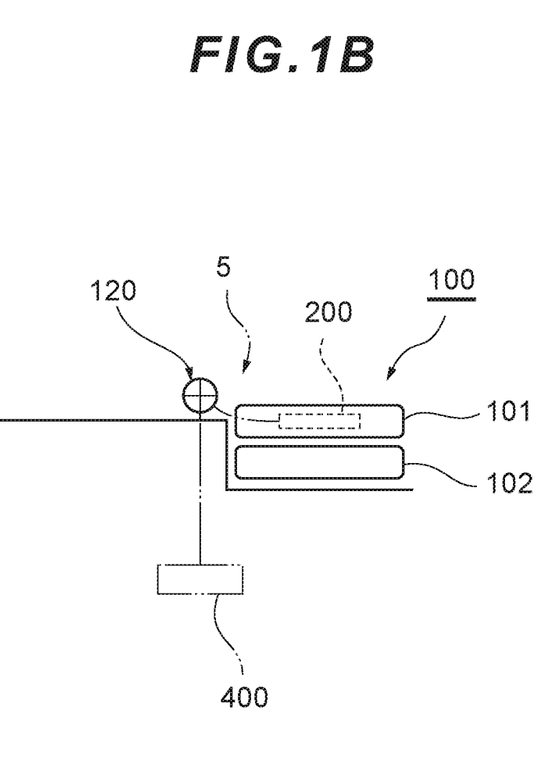

The seat 100 in this embodiment is a so-called flip-up seat in which a seating part 101 and a seat back 102 are can be rotated backward around a rotating shaft 120 provided behind the seating part 101 and can be stored (see FIGS. 1A and 1B). In the vehicle in this embodiment, a flat space is formed near the vehicle rear seat in a state in which the seat 100 is stored.

An electric device 200 is installed in the seating part 101 of the seat 100. The electric device 200 is specifically a device such as a sensor for a seat belt reminder or a seat heater. The electric device 200 is connected to, through a power feeding path 5, a power feeding device 400 provided in the vehicle.

One side portion of the seating part 101 of the seat 100 is rotatably supported by a bearing member 2 of a bearing structure 1. The bearing structure 1 in this embodiment includes a base member 20, an arm member 21, and a power feeding unit 3 (see FIG. 2 and the like). Note that, although not particularly illustrated, the other side portion of the seating part 101 is rotatably supported by another bearing member.

The base member 20 is a member provided in the vehicle and configuring the bearing member 2 of the seating part 101. In this embodiment, the base member 20 having a bracket shape is fixed to a frame of the vehicle to configure a bearing member of the seating part 101 (see FIG. 2 and the like).

The arm member 21 is a member provided in the seating part 101 by, for example, a screw 310 and rotatably supported by the base member 20. In this embodiment, the arm member 21 having the bracket shape is attached to a side portion of the seating part 101 and integrated (see FIG. 2 and the like). Note that a configuration is illustrated in which the arm member 21, which is a separate member, is provided in the seating part 101. However, naturally, a configuration may be adopted in which, for example, a part of, for example, a frame of the seating part 101 is supported as a portion equivalent to an arm.

The power feeding unit 3 is a member disposed halfway in the power feeding path 5 from the power feeding device 400 to the electric device 200 and always retaining a power-feedable state irrespective of a relative angle of the arm 20 with respect to the base 10. The power feeding unit 3 in this embodiment includes a base-side unit structure 30, a rotary member-side unit structure 31, a conductor 32, and a contactor 33 (see FIGS. 5 and 7 and the like).

The base-side unit structure 30 and the rotary member-side unit structure 31 are members combined to form a casing. In this embodiment, the base-side unit structure 30 and the rotary member-side unit structure 31 having flat plate shapes such as petri dishes having different diameters from each other are combined to form a flat columnar casing unit capable of relatively rotating (see FIG. 5 and the like). The base-side unit structure 30 is disposed on the base member 20 side and the rotary member-side unit structure 31 is disposed on the arm member 21 side (see FIG. 7 and the like). A locking protrusion 30T functioning as a contactor housing or a retaining member that locks the contactor 33 and retains the position of the contactor 33 is provided in a predetermined place on the inner side surface of the base-side unit structure 30 (see FIGS. 2 and 4).

Figure 5:
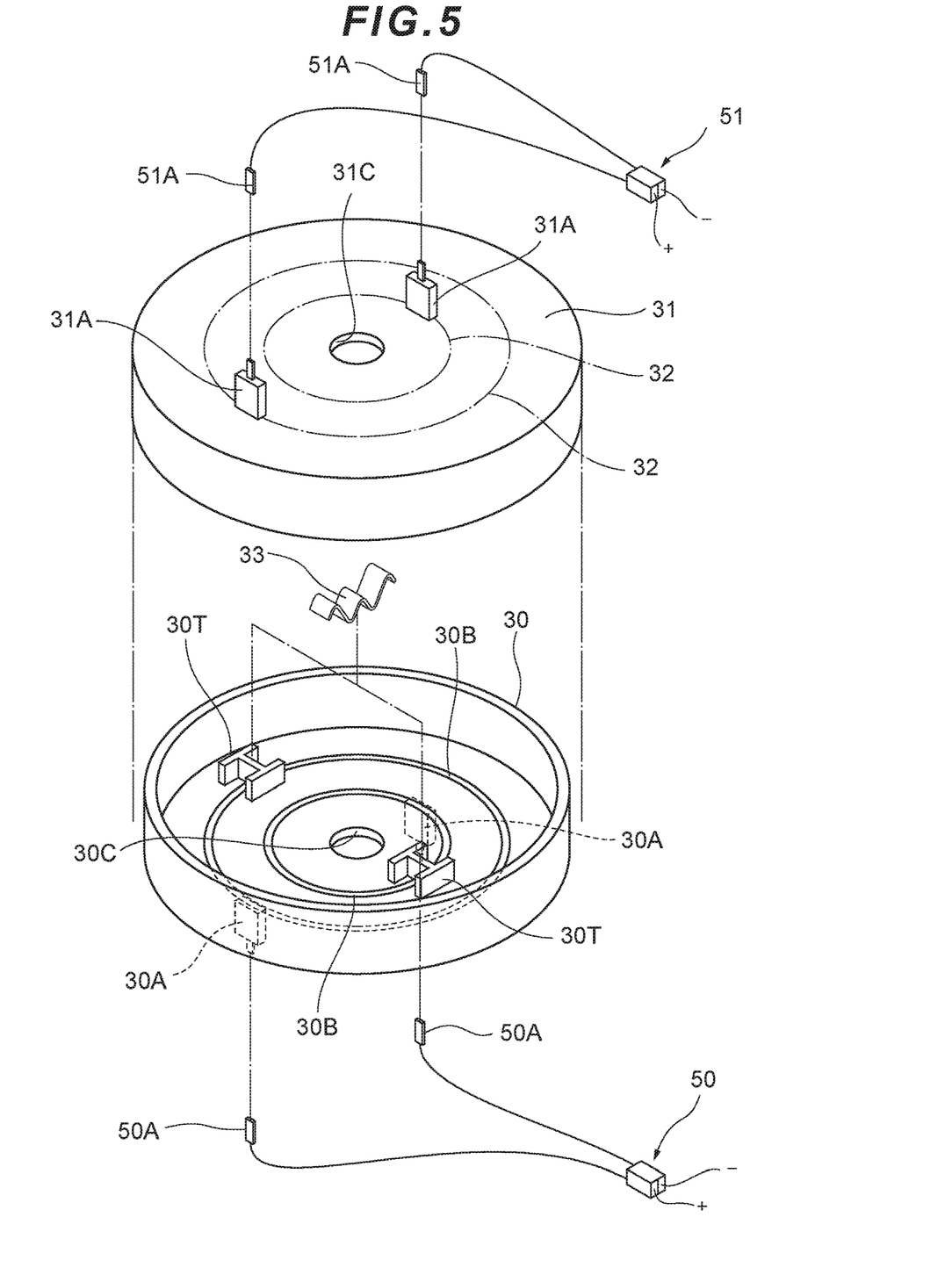
FIG. 5 is an exploded view of a configuration example of the inside and the like of the power feeding unit.
Figure 6:
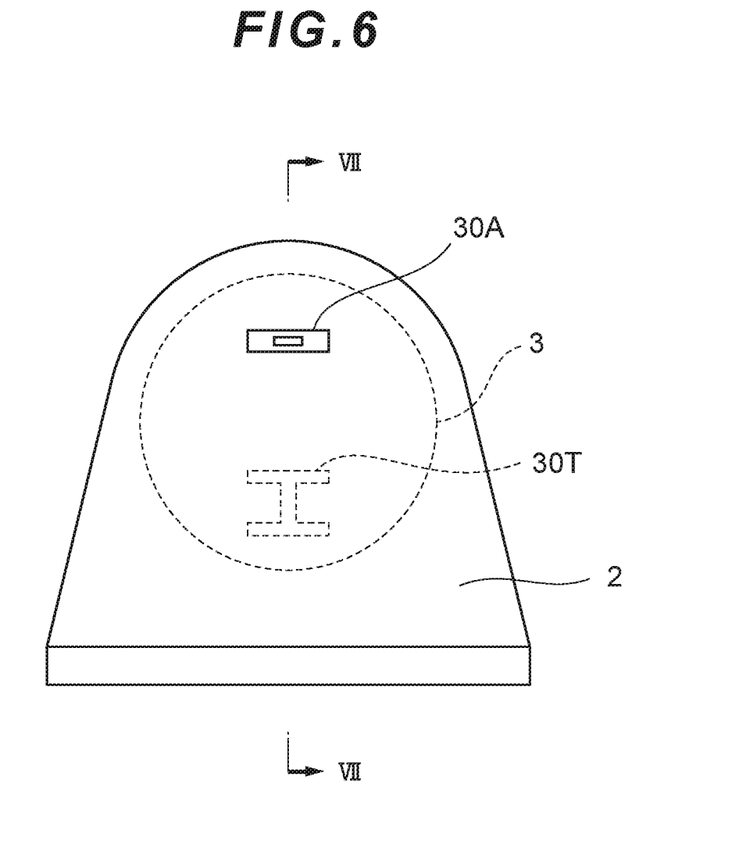
FIG. 6 is a view of the bearing member along a rotating shaft, the view showing a configuration example of the bearing structure in which the power feeding path is one system.
Figure 7:
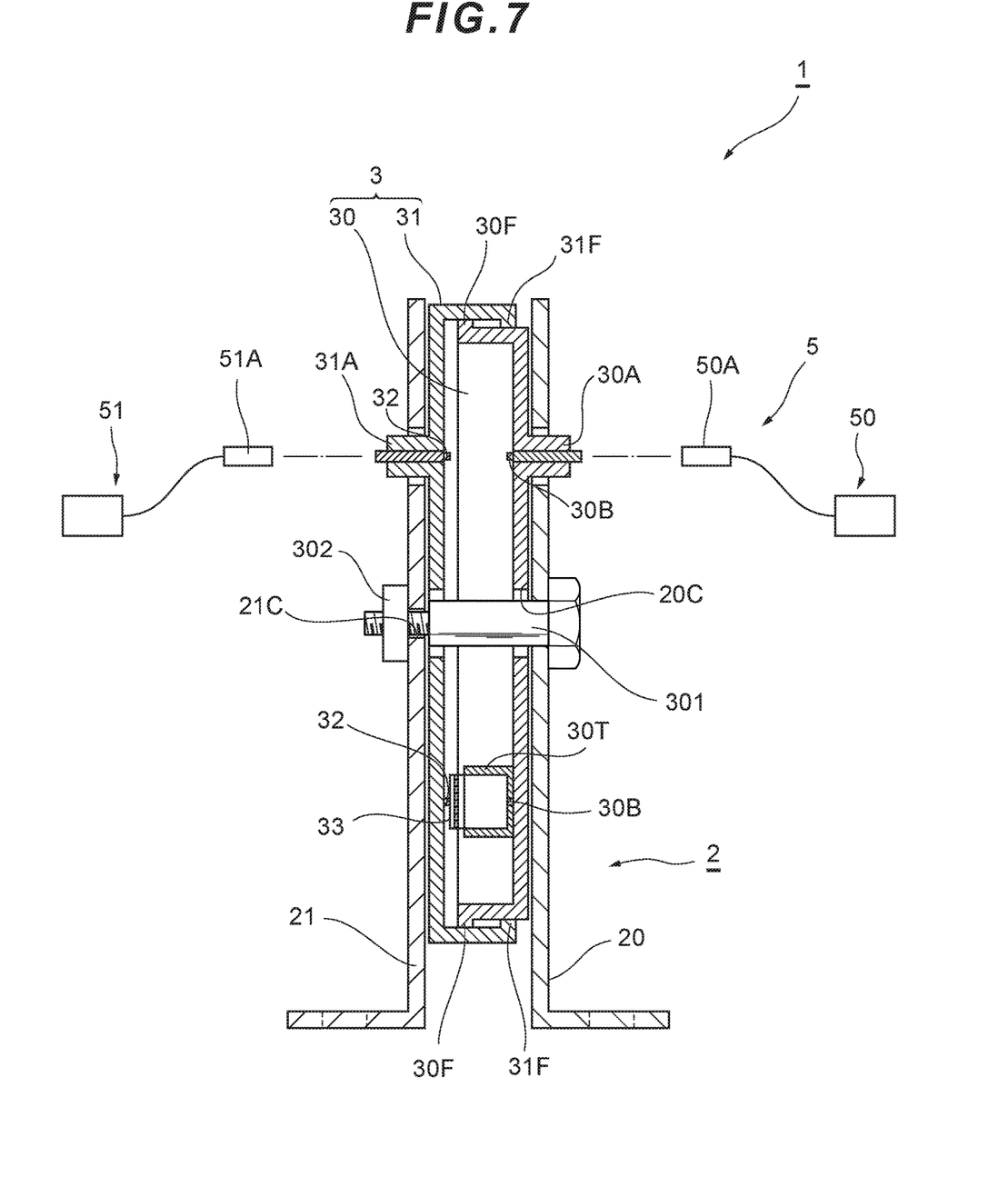
FIG. 7 is a sectional view of the bearing structure taken along a VII-VII line in FIG. 6.

The conductor 32 is provided as an arcuate or circumferential conductive rail around a rotation center on the surface on the inner side of the rotary member-side unit structure 31 (see FIGS. 5 and 7).

The contactor 33 is a member disposed between the base-side unit structure 30 and the rotary member-side unit structure 31 and having elasticity for always keeping an electric conduction state with the conductor 32. As an example, in this embodiment, the contactor 33 made of a steel material formed in a wavy shape such as a M shape or a W shape is adopted (see FIG. 4 and the like). The contactor 33 urges the base-side unit structure 30 and the rotary member-side unit structure 31 to be separated from each other. The contactor 33 in this embodiment is provided in a state in which the contactor 33 is locked by the locking protrusion 30T of the base-side unit structure 30. The contactor 33 is in slide contact with the conductor 32 of the relatively rotating rotary member-side unit structure 31 while keeping a state of contact with the conductor 32 (see FIGS. 5 and 7).

In the base-side unit structure 30, harness connection terminals 30A, to which terminals 50A of a power feeding harness 50 are connected, are provided. Further, a conductor 30B for making the harness connection terminals 30A to the contactor 33 conductive is provided on the inner circumferential surface of the base-side unit structure 30. In the bearing structure 1 configuring the power feeding path 5 of two systems (plus and minus), two harness connection terminals 30A and two conductors 30B (in two systems) are provided according to the number of systems (see FIGS. 3 and 5). Similarly, two contactors 33 and two locking protrusions 30T (in two systems) are provided. Note that, when the power feeding path 5 is one system, one harness connection terminal 30A and one conductor 30B (in one system) are provided according to the number of systems (see FIGS. 6 and 7).

Figure 2:
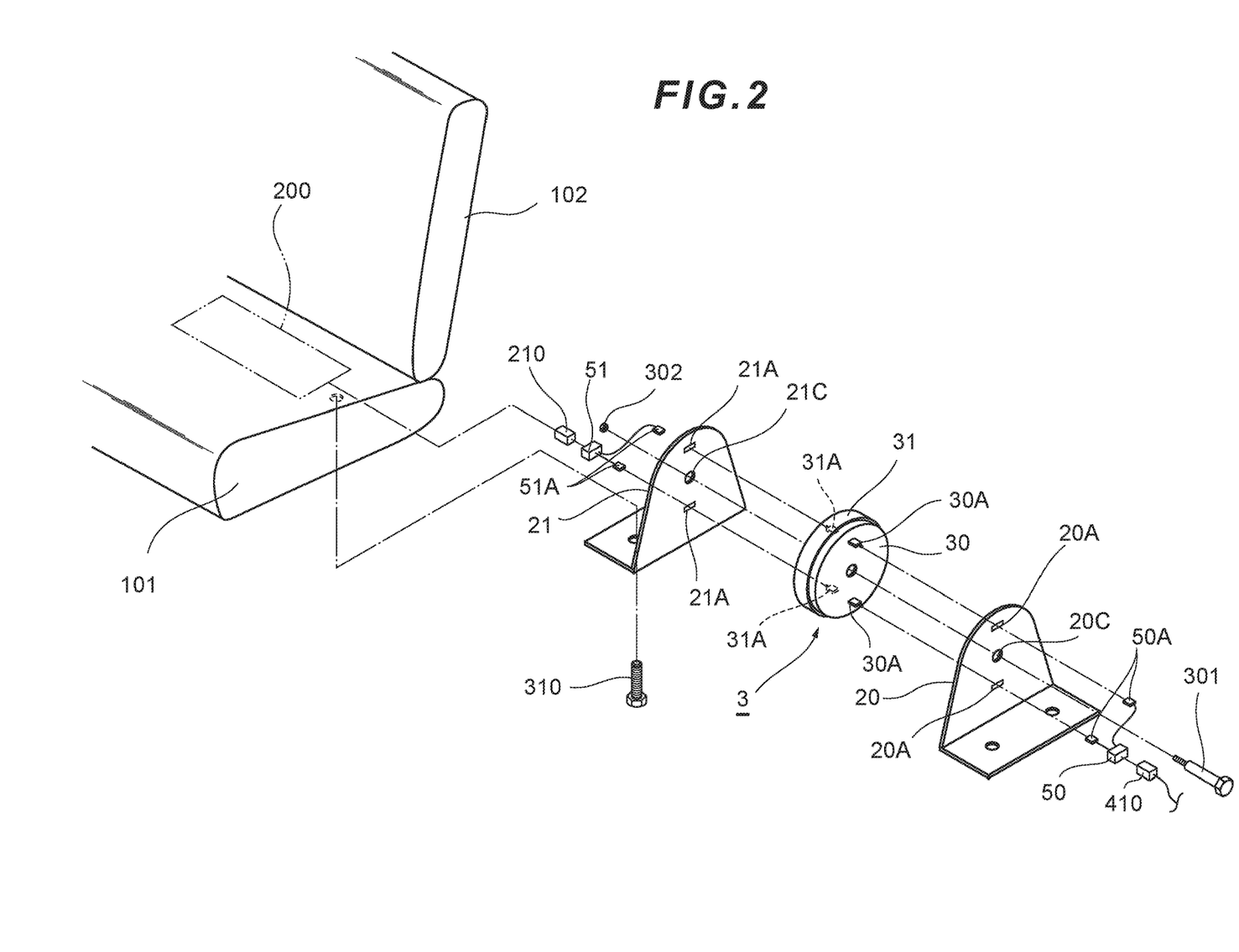
FIG. 2 is an exploded perspective view showing an example of a bearing structure with a power feeding path.
Figure 3:
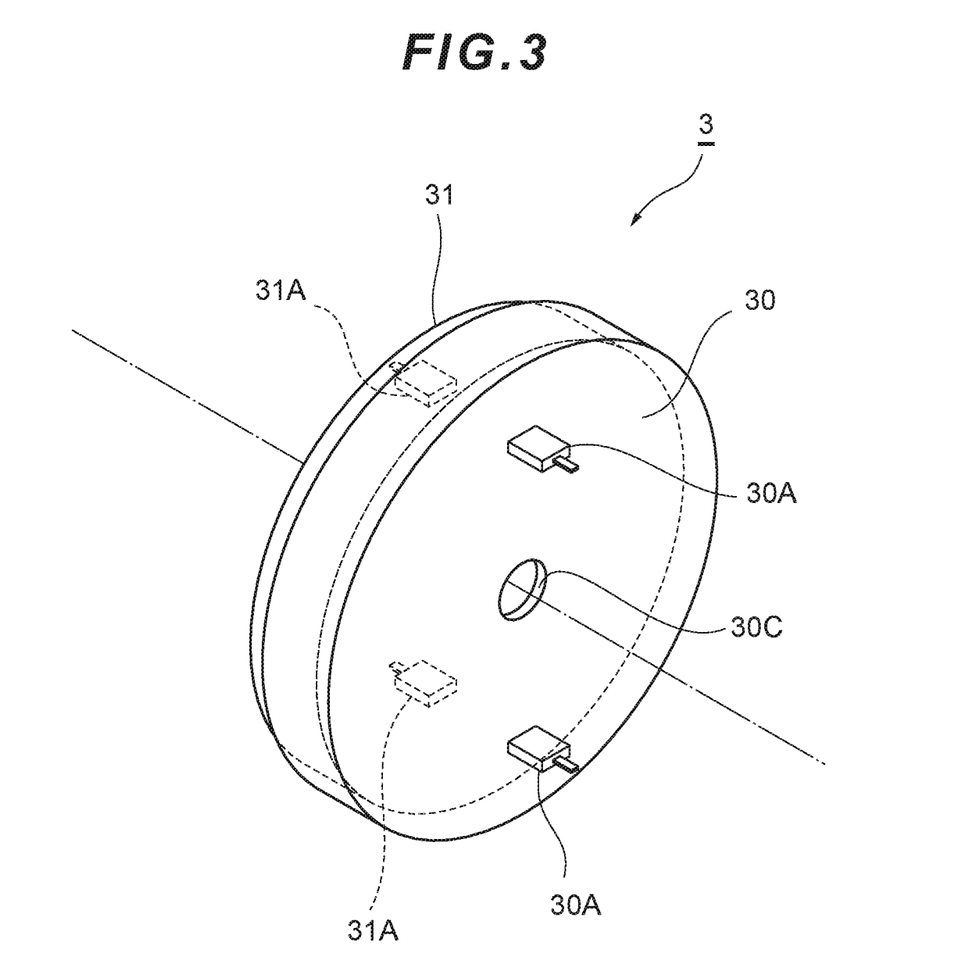
FIG. 3 is a perspective view showing an example of a power feeding unit.
Figure 4:
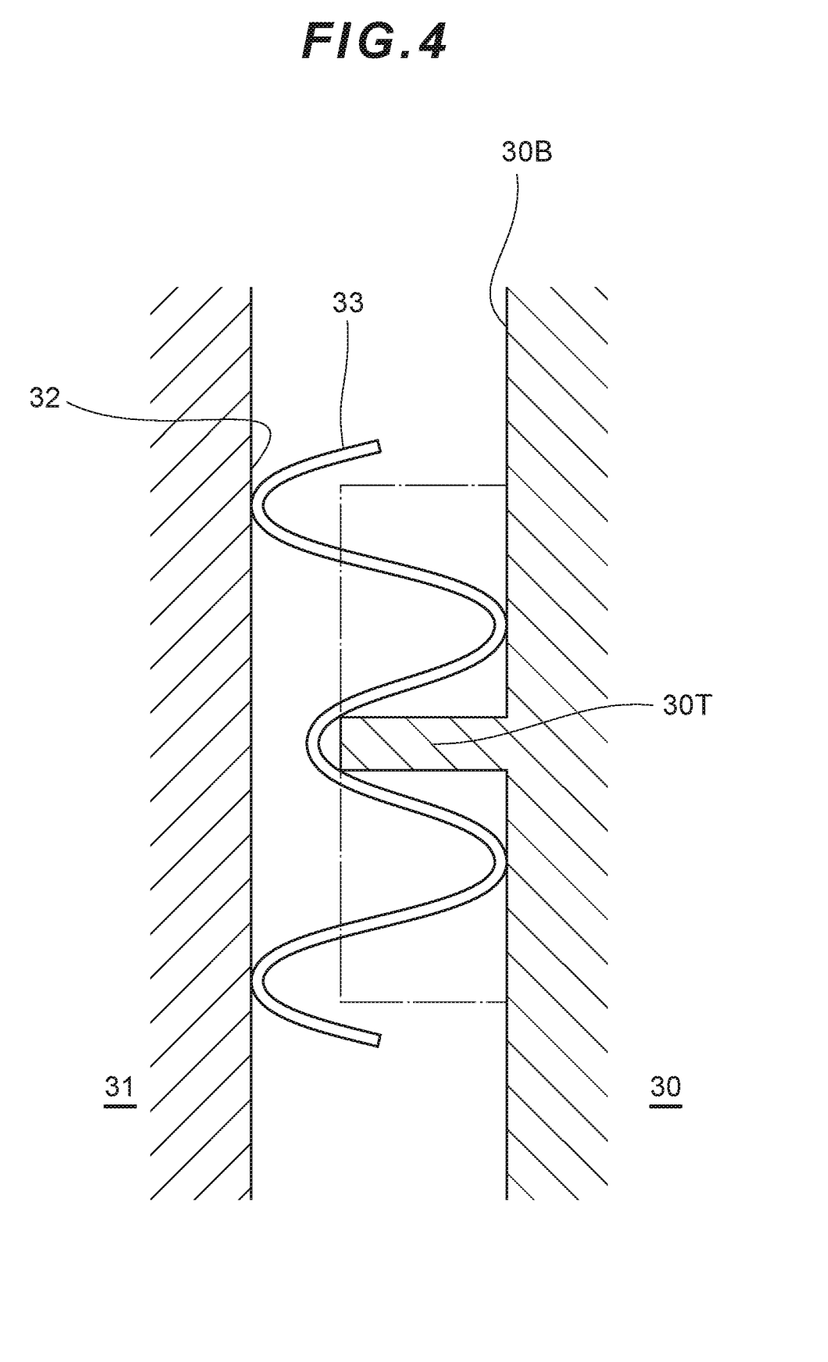
FIG. 4 is a diagram showing a configuration example of a contactor and the periphery of the contactor.

In the base member 20, through-holes 20A, through which the harness connection terminals 30A are inserted, are provided in two places according to the positions of the harness connection terminals 30A (see FIG. 2 and the like). The harness connection terminals 30A locked in the through-holes 20A function as stoppers that restrict a relative rotating motion of the base-side unit structure 30 with respect to the base member 20.

Harness connection terminals 31A, to which terminals 51A of a power feeding harness 51 are connected, are provided in the rotary member-side unit structure 31 (see FIG. 5 and the like). In the bearing structure 1 in this embodiment configuring the power feeding path 5 of two systems (plus and minus), two harness connection terminals 31A and two conductors 32 (in two systems) are provided according to the number of systems (see FIG. 5). Note that, when the power feeding path 5 is one system, one harness connection terminal 31A and one conductor 31B (in one system) are provided according to the number of systems (see FIGS. 6 and 7).

In the arm member 21, through-holes 21A, through which the harness connection terminals 31A are inserted, are provided in two places according to the positions of the harness connection terminals 31A (see FIG. 2 and the like).

The harness connection terminals 30A locked in the through-holes 21A function as stoppers that restrict a relative rotating motion of the base-side unit structure 30 with respect to the arm member 21.

In this vehicle, the power supply path 5 for feeding electric power from the power feeding device 400 to the electric device 200 of the vehicle is formed (see FIGS. 1A, 1B and the like). The power feeding path 5 in this embodiment includes the vehicle body-side power feeding harness 50, a vehicle body-side harness 410, the power feeding harness 51 on the seat 100 side, a seat-side harness 210, and the power feeding unit 3.

The power feeding unit 3 in this embodiment is sandwiched between the base member 20 configuring the bearing member 2 and the arm member 21 configuring the seat (the rotary member) 100 and is disposed in a position interposed between the base member 20 and the arm member 21 (see FIG. 7 and the like). Even if the interval between the base member 20 and the arm member 21 fluctuates or the base member 20 and the arm member 21 are relatively inclined and are not in parallel, in the bearing structure 1 in this embodiment, the contactor 33 having a spring property separates the base-side unit structure 30 and the rotary member-side unit structure 31 along the axial direction, urges the base-side unit structure 30 to be pressed against the base member 20, and urges the rotary member-side unit structure 31 to be pressed against the arm member 21. Therefore, such fluctuation in the axial direction is absorbed or allowed or a smooth motion of rotation or the like is prevented from being spoiled. Note that, when a plurality of contactors 33 are provided in the power feeding unit 3, deviation of an urging force by the contactors 33 can be reduced and caused to act in a well-balanced state if the contactors 33 are disposed in positions equally divided in the circumferential direction as in this embodiment (see FIG. 5 and the like).

In the power feeding unit 3 in this embodiment, an outer flange section 30F projecting to the radial direction outer side is formed at the edge of the peripheral wall of the base-side unit structure 30 and an inner flange section 31F projecting to the radial direction inner side to interfere with the outer flange section 30F is formed at the edge of the peripheral wall of the rotary member-side unit structure 31 (see FIG. 7 and the like). The flange sections (the outer flange section 30F and the inner flange section 31F) prevent the base-side unit structure 30 and the rotary member-side unit structure 31 from easily coming off.

A through-hole 20C, a through-hole 21C, a through-hole 30C, and a through-hole 31C are respectively provided in portions coinciding with the rotating shaft of the seat 100 in the base member 20, the arm member 21, the base-side unit structure 30, and the rotary member-side unit structure 31 (see FIGS. 2 and 5 and the like). In this embodiment, a stepped bolt 301 is inserted through the through hole 20C, the through-hole 21C, the through-hole 30C, and the through-hole 31C, a nut 302 is screwed on the bolt 301 and fastened, and the power feeding unit 3 is set between the base member 20 and the arm member 21 (see FIG. 7). When being fastened, a step portion of the stepped bolt 301 is brought into contact with the arm member 21 (or the base member 20) to always maintain the interval between the base member 20 and the arm member 21 at a fixed value or more.

In the bearing structure 1 in this embodiment adopting a so-called hinge structure including the power feeding unit 3 and the like explained above, the contactor 33 is provided in one of the relatively rotating unit structures (the base-side unit structure 30 and the rotary member-side unit structure 31). A sliding surface (the conductor 32) is provided on the opposed side of the contactor 33. A part of the contactor 33 slides while always keeping contact with the conductor 32. That is, a conductive path including contactor 33 and the conductor 32 always retaining an electric conduction state is formed between the seat 100, which performs a rotating motion in flip-up, and the bearing member 2 of the seat 100. Therefore, with the bearing structure 1, it is unnecessary to dispose a harness around the bearing member 2. Therefore, it is unnecessary to provide an excess length for preventing the harness from being stretched, prevent the harness having the excess length from being bit, and improve appearance of the harness when being slacked as in the structure in the past.

Note that the embodiment explained above is an example of a preferred embodiment of the present invention. However, the embodiment is not limited to this and can be variously modified and implemented in a range not departing from the gist of the present invention.

Figure 8:
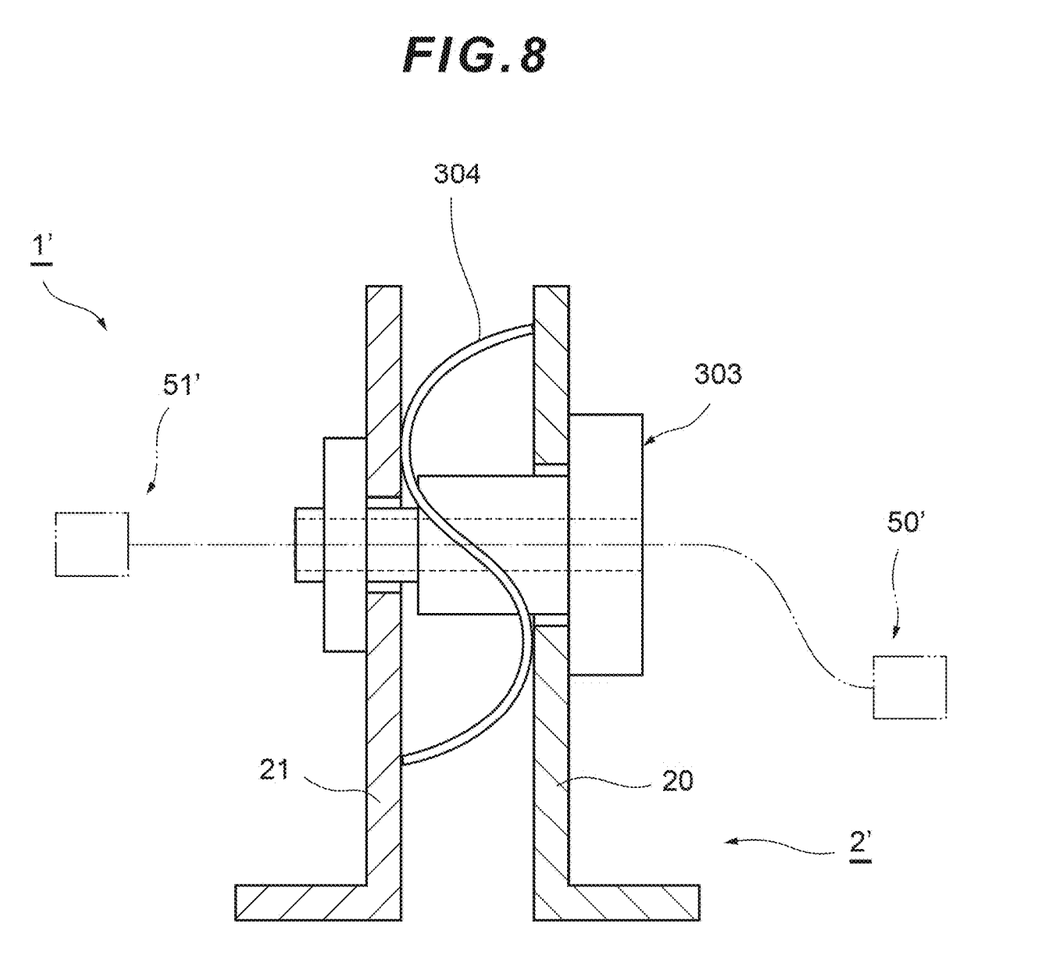
FIG. 8 is a diagram showing another form of the bearing structure with the power feeding path.

Another embodiment which is different from the embodiment of the bearing structure with the power feeding path is explained below (see FIG. 8). This bearing structure 1' is a bearing structure including a bearing member 2' that supports a rotatable rotary member (e.g., a seat in a rear part) and being configured to be attached to a vehicle. The bearing structure is a bearing structure 1' with a power feeding path, including a shaft disposed along the rotation center of the rotary member and pivotally supported by the bearing member 2', the shaft being a rotating shaft 7 in which a power feeding path 5' configured by a power feeding harness 51' for feeding electric power from the power feeding device 400 of the vehicle to the electric device 200 provided in the rotary member is formed in the shaft.

Reference numeral 303 denotes a stepped hinge shaft structure connected to the rotary member. In the bearing structure 1', the power feeding harnesses 50' and 51' pierce through the inside of the hinge shaft structure 303 (see FIG. 8). Reference numeral 304 denotes urging means such as a wave washer provided when a backlash suppressing function is necessary in the hinge shaft structure 303.

In the bearing structure 1' in this embodiment adopting the so-called hinge structure including the power feeding unit 3' explained above, an electric conduction state is always kept by the power feeding harnesses 50' and 51' while the seat 100 performs a rotating motion in flip-up. Therefore, with the beating structure 1, it is unnecessary to dispose a harness around the bearing member 2. Therefore, it is unnecessary to provide an excess length for preventing the harness from being stretched, prevent the harness having the excess length from being bit, and improve appearance of the harness when being slacked as in the structure in the past.

The present invention is suitably applied to a bearing structure, which is attached to a vehicle, of a rotary member such as a flip-up seat with an electric device.

What is claimed is:

1. A bearing structure with a power feeding path, the bearing structure including a bearing member that supports a rotatable rotary member and being configured to be attached to a vehicle, the bearing structure comprising:
   a power feeding unit disposed in a position interposed between a member configuring the rotary member and a member configuring the bearing member and including a base-side unit structure provided on the bearing member side, a rotary member-side unit structure relatively rotatable with respect to the base-side unit structure and provided on the rotary member side, an arcuate or circumferential conductor provided in one of the base-side unit structure and the rotary member-side unit structure, and a contactor provided in another of the base-side unit structure and the rotary member-side unit structure and configured to retain an electric conduction state with the conductor; and a power feeding path configured by a power feeding harness for feeding, via the conductor and the contactor, electric power from a power feeding device of the vehicle to an electric device provided in the rotary member, wherein the contactor is formed in a wavy shape by an elastic body that urges the base-side unit structure and the rotary member-side unit structure to directions in which the base-side unit structure and the rotary member-side unit structure are separated from each other.

2. The bearing structure with the power feeding path according to claim 1, wherein a retaining section that retains a position of the contactor is formed in the power feeding unit.

3. The bearing structure with the power feeding path according to claim 1, wherein a plurality of the power feeding paths are present, and a plurality of the contactors are respectively provided in the power feeding paths.

4. The bearing structure with the power feeding path according to claim 3, wherein the contactors are disposed in positions equally divided in a circumferential direction.

5. A bearing structure with a power feeding path, the bearing structure including a bearing member that supports a rotatable rotary member and being configured to be attached to a vehicle, the bearing structure comprising:

a power feeding unit disposed in a position interposed between a member configuring the rotary member and a member configuring the bearing member and including a base-side unit structure provided on the bearing member side, a rotary member-side unit structure relatively rotatable with respect to the base-side unit structure and provided on the rotary member side, an arcuate or circumferential conductor provided in one of the base-side unit structure and the rotary member-side unit structure, and a contactor provided in another of the base-side unit structure and the rotary member-side unit structure and configured to retain an electric conduction state with the conductor; and a power feeding path configured by a power feeding harness for feeding, via the conductor and the contactor, electric power from a power feeding device of the vehicle to an electric device provided in the rotary member, wherein the contactor is formed by an elastic body that urges the base-side unit structure and the rotary member-side unit structure to directions in which the base-side unit structure and the rotary member-side unit structure are separated from each other, and wherein a stopper that restricts a relative rotating motion of the base-side unit structure or the rotary member-side unit structure is provided in the power feeding unit.

6. The bearing structure with the power feeding path according to claim 5, wherein the rotary member is a flip-up storable seat provided in a rear part of the vehicle.

* * * * *